United States Patent
Hodatsu et al.

(10) Patent No.: US 9,950,690 B2
(45) Date of Patent: Apr. 24, 2018

(54) SEAT BELT RETRACTOR AND SEAT BELT DEVICE

(71) Applicant: TAKATA CORPORATION, Tokyo (JP)

(72) Inventors: Yuichiro Hodatsu, Tokyo (JP); Miguel Pruneda, Auburn Hills, MI (US)

(73) Assignee: TAKATA CORPORATION, Tokyo (JP)

( * ) Notice: Subject to any disclaimer, the term of this patent is extended or adjusted under 35 U.S.C. 154(b) by 56 days.

(21) Appl. No.: 15/087,059

(22) Filed: Mar. 31, 2016

(65) Prior Publication Data

US 2016/0288768 A1   Oct. 6, 2016

(30) Foreign Application Priority Data

Apr. 3, 2015 (JP) .................................. 2015-077127

(51) Int. Cl.
*B60R 22/38* (2006.01)
*B60R 22/40* (2006.01)
*B60R 22/34* (2006.01)

(52) U.S. Cl.
CPC .............. *B60R 22/40* (2013.01); *B60R 22/34* (2013.01); *B60R 2022/3402* (2013.01)

(58) Field of Classification Search
USPC .......... 242/382.1, 382.2, 382.3, 383.1, 383.2
See application file for complete search history.

(56) References Cited

U.S. PATENT DOCUMENTS

| | | | | |
|---|---|---|---|---|
| 5,484,118 A | * | 1/1996 | Fujimura | B60R 22/405 242/381.1 |
| 6,443,382 B1 | * | 9/2002 | Bae | B60R 22/405 242/382.6 |
| 7,681,824 B2 | * | 3/2010 | Mori | B60R 22/405 242/382.1 |
| 7,681,825 B2 | * | 3/2010 | Sumiyashiki | B60R 22/405 242/383.1 |
| 7,883,044 B2 | | 2/2011 | Hiramatsu et al. | |
| 8,430,350 B2 | | 4/2013 | Hiramatsu et al. | |
| 2006/0243844 A1 | | 11/2006 | Kosugi et al. | |

(Continued)

FOREIGN PATENT DOCUMENTS

JP   2006-327556 A   12/2006
JP   2008-024102 A   2/2008

(Continued)

*Primary Examiner* — Toan To
(74) *Attorney, Agent, or Firm* — Foley & Lardner LLP

(57) ABSTRACT

To provide a seat belt retractor and a seat belt device capable of shortening time taken to restrict rotation of a spool. A seat belt retractor according to the present invention includes a spool 2, a base frame 3, a spring unit 4, a vehicle sensor 5, a locking mechanism 6, and a pretensioner 7. The locking mechanism 6 includes a lock gear 61 and a retainer 62. The lock gear 61 includes an outer circumferential wall 61a that is disposed at an end portion of the spool 2 and engageable with the vehicle sensor 5. The retainer 62 includes an inner circumferential wall 62a disposed on the inner side of the outer circumferential wall 61a and a side wall 62e that defines a space accommodating the lock gear 61. The lock gear 61 becomes engaged with the inner circumferential wall 62a or the side wall 62e of the retainer 62 when the lock gear 61 becomes eccentric relative to the retainer 62.

10 Claims, 9 Drawing Sheets

(56) References Cited

U.S. PATENT DOCUMENTS

| | | | | |
|---|---|---|---|---|
| 2007/0246592 A1* | 10/2007 | Yamada | ................. | B60R 22/38 |
| | | | | 242/383.2 |
| 2008/0203808 A1* | 8/2008 | Yoshioka | .............. | B60R 22/405 |
| | | | | 297/478 |
| 2011/0133012 A1* | 6/2011 | Mori | .................... | B60R 22/405 |
| | | | | 242/384 |
| 2015/0108263 A1* | 4/2015 | Suminaka | ............. | B60R 22/405 |
| | | | | 242/379.1 |
| 2015/0224958 A1* | 8/2015 | Lee | ...................... | B60R 22/405 |
| | | | | 242/382 |
| 2015/0224959 A1* | 8/2015 | Suminaka | ........... | B60R 22/4633 |
| | | | | 242/383.4 |
| 2015/0360642 A1* | 12/2015 | Lee | ...................... | B60R 22/405 |
| | | | | 242/383.2 |

FOREIGN PATENT DOCUMENTS

| | | |
|---|---|---|
| JP | 2010-202061 A | 9/2010 |
| JP | 2011-111007 A | 6/2011 |
| JP | 2013-086759 A | 5/2013 |
| JP | 2014-080121 A | 5/2014 |
| WO | WO-2013/058142 A1 | 4/2013 |

* cited by examiner

F

SEAT BELT RETRACTOR AND SEAT BELT DEVICE

FIELD OF THE INVENTION

The present invention relates to seat belt retractors and seat belt devices, and more specifically, to a seat belt retractor including a lock gear at an end portion of a spool and a seat belt device including the seat belt retractor.

BACKGROUND OF THE INVENTION

A vehicle such as an automobile generally includes a seat belt device that restrains an occupant in a seat including a seat portion, on which an occupant is seated, and a backrest portion located on the back of the occupant. Such a seat belt device includes a webbing that restrains the occupant, a seat belt retractor that retracts the webbing, a guide anchor that is disposed on a vehicle body and that guides the webbing, a belt anchor that fixes the webbing to the vehicle body, a buckle disposed on a side surface of the seat, and a tongue disposed on the webbing. Fitting the tongue into the buckle causes the webbing to restrain the occupant in the seat.

Such a seat belt retractor often includes a spool on which a webbing is wound, a base frame that accommodates the spool while allowing the spool to rotate, a spring unit that applies a retracting force to the spool, a vehicle sensor (also referred to as an acceleration sensor or a shock sensor) that detects sudden deceleration of the vehicle, a locking mechanism that is activated by the vehicle sensor and that causes the spool to be engaged with the base frame, and a pretensioner that removes the slack of the webbing in case of emergency such as a collision of the vehicle (see, for example, Japanese Unexamined Patent Application Publication No. 2013-86759 and Japanese Unexamined Patent Application Publication No. 2014-80121).

SUMMARY OF INVENTION

Generally, in the above-described seat belt retractor, both end portions of the spool are often inserted into an opening formed in a base plate, one end portion is often supported by the spring unit fixed to the base plate, and the other end portion is often supported by a pretensioner cover that accommodates part of the pretensioner or a retainer that accommodates the locking mechanism. A lock gear included in the locking mechanism is fitted in an end portion of the spool so as to be coaxial with the spool.

The vehicle sensor generally includes a spherical mass body and a sensor lever that swings in accordance with the movement of the mass body. When the vehicle decelerates to or below a predetermined rate or leans a predetermined degree or greater, the balance of the mass body is lost and the sensor lever is pushed upward. Then, the end of the sensor lever becomes engaged with the lock gear, so that the rotation of the lock gear is restricted. Finally, the rotation of the spool is restricted.

As described above, during the time from when the vehicle sensor detects sudden deceleration or other events of the vehicle until when the rotation of the spool is restricted and the pull-out of the webbing is restricted, it takes a predetermined time length from when the sensor lever swings until when its end becomes engaged on the lock gear. In these years, an enhancement of the performance is highly required also in the field of the seat belt device and an existing seat belt retractor is required to further shorten the time taken to restrict the rotation of the spool.

The present invention is made in view of the above-described problems and aims to provide a seat belt retractor and a seat belt device that enable a shortening of time taken to restrict rotation of a spool.

The present invention provides a seat belt retractor that includes a spool that retracts a webbing that restrains an occupant; a base frame that accommodates the spool while allowing the spool to rotate; a vehicle sensor that detects sudden deceleration of a vehicle; and a locking mechanism that is activated by the vehicle sensor and that causes the spool to be engaged with the base frame. The locking mechanism includes a lock gear and a retainer, the lock gear includes an outer circumferential wall that is disposed at an end portion of the spool and engageable with the vehicle sensor, and the retainer includes an inner circumferential wall disposed on an inner side of the outer circumferential wall and a side wall that defines a space accommodating the lock gear. When the lock gear becomes eccentric relative to the retainer, the lock gear becomes engaged with the inner circumferential wall or the side wall of the retainer.

The present invention also provides a seat belt device that includes a webbing that restrains an occupant; a seat belt retractor that retracts the webbing; a guide anchor that is disposed on a vehicle body and that guides the webbing; a belt anchor that fixes the webbing to the vehicle body; a buckle disposed on a side surface of a seat on which the occupant is seated; and a tongue that is disposed on the webbing. The seat belt retractor includes a spool that retracts the webbing; a base frame that accommodates the spool while allowing the spool to rotate; a vehicle sensor that detects sudden deceleration of a vehicle; and a locking mechanism that is activated by the vehicle sensor and that causes the spool to be engaged with the base frame. The locking mechanism includes a lock gear and a retainer, the lock gear includes an outer circumferential wall that is disposed at an end portion of the spool and engageable with the vehicle sensor, and the retainer includes an inner circumferential wall disposed on an inner side of the outer circumferential wall and a side wall that defines a space accommodating the lock gear. When the lock gear becomes eccentric relative to the retainer, the lock gear becomes engaged with the inner circumferential wall or the side wall of the retainer.

In the seat belt retractor and the seat belt device described above, engagement inner teeth may be formed on an inner surface of the outer circumferential wall and engagement outer teeth engageable with the engagement inner teeth may be formed at at least a portion of an outer surface of the inner circumferential wall. The engagement inner teeth may be formed over an entire circumference of the inner surface of the outer circumferential wall.

The engagement outer teeth may be formed at a portion of the inner circumferential wall that touches the outer circumferential wall when the lock gear becomes eccentric in a direction in which the webbing is pulled out. The seat belt retractor may include a pretensioner that removes slack of the webbing, and the engagement outer teeth may be formed at a portion of the inner circumferential wall that touches the outer circumferential wall when the lock gear becomes eccentric in a direction in which a reaction force caused in the spool at activation of the pretensioner is exerted.

In the seat belt retractor and the seat belt device described above, engagement teeth engageable with the vehicle sensor may be formed on an outer surface of the outer circumferential wall and an engagement portion engageable with the engagement teeth may be formed at at least a portion of an inner surface of the side wall. The engagement portion may be formed over a substantially entire area of the side wall that covers the outer circumferential wall.

The engagement portion may be formed at a portion of the side wall that touches the outer circumferential wall when the lock gear becomes eccentric in a direction in which the webbing is pulled out. The seat belt retractor may include a pretensioner that removes slack of the webbing, and the engagement portion may be formed at a portion of the side wall that touches the outer circumferential wall when the lock gear becomes eccentric in a direction in which a reaction force caused in the spool at activation of the pretensioner is exerted.

In the seat belt retractor and the seat belt device according to the present invention described above, the engagement inner teeth are formed on the inner surface of the outer circumferential wall of the lock gear and the engagement outer teeth are formed on the outer surface of the inner circumferential wall of the retainer. Thus, the seat belt retractor and the seat belt device can restrict the rotation of the lock gear as a result of engaging the engagement inner teeth and the engagement outer teeth with one another when the spool (lock gear) moves and becomes eccentric relative to the retainer, and therefore restrict the rotation of the spool. The seat belt retractor and the seat belt device thus can restrict the rotation of the lock gear without the vehicle sensor and shorten the time taken to restrict the rotation of the spool, whereby the performance of the seat belt retractor and the seat belt device can be enhanced.

BRIEF DESCRIPTION OF THE DRAWINGS

FIG. 2(A) is a partially exploded view of the seat belt retractor and FIG. 2(B) is a perspective view of the inside of the retainer.

FIG. 3(A) illustrates a state before the lock gear and the retainer are engaged together and FIG. 3(B) illustrates a state after the lock gear and the retainer are engaged together.

FIG. 4(A) illustrates a first modified example, FIG. 4(B) illustrates a second modified example, and FIG. 4(C) illustrates a third modified example.

FIG. 5(A) illustrates a state before the lock gear and the retainer are engaged together and FIG. 5(B) illustrates a state after the lock gear and the retainer are engaged together.

FIG. 6(A) illustrates a first modified example, FIG. 6(B) illustrates a second modified example, and FIG. 6(C) illustrates a third modified example.

DETAILED DESCRIPTION OF THE PREFERRED EMBODIMENTS

Figure 1:
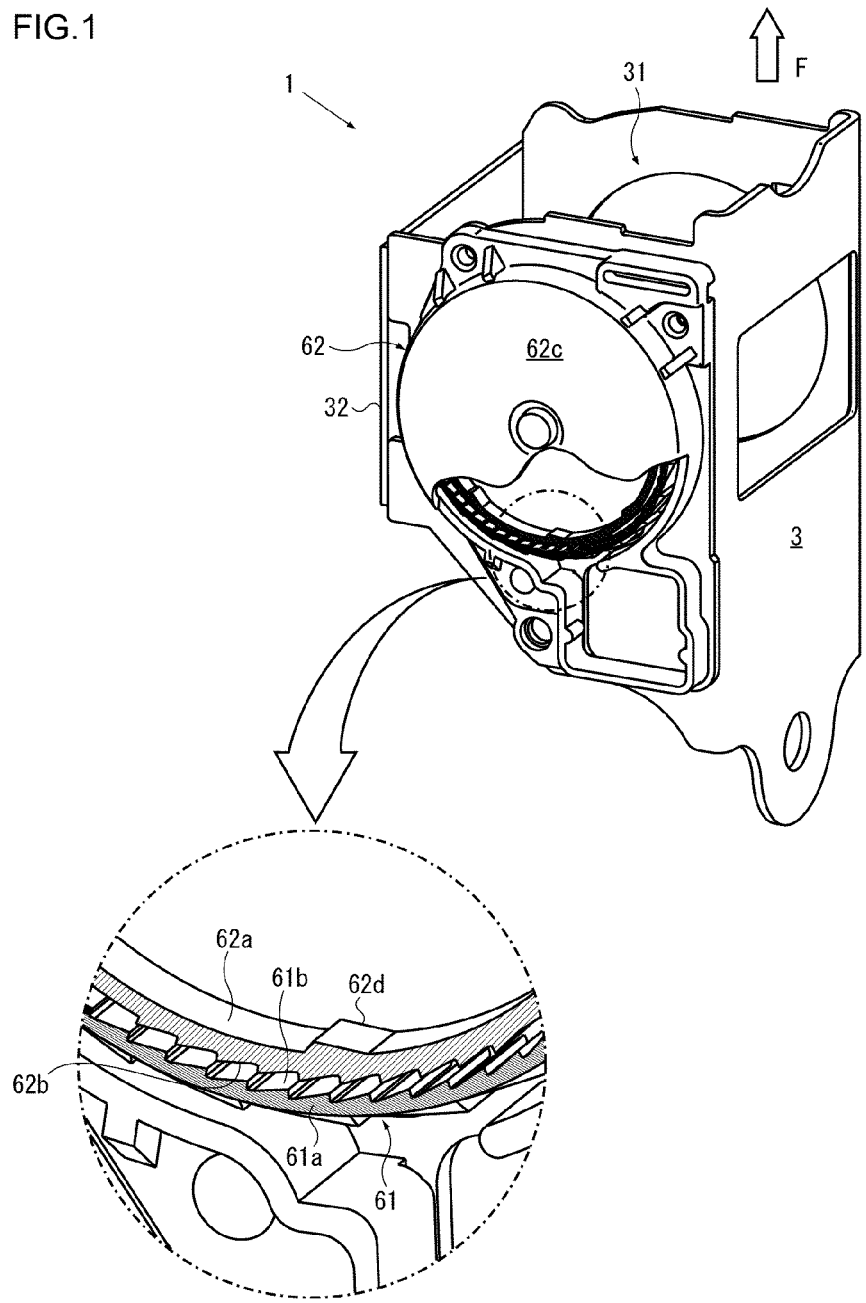
FIG. 1 is a partially detailed drawing of a seat belt retractor according to a first embodiment of the present invention.

Referring now to FIGS. 1 to 7, embodiments of the present invention are described below. Here, FIG. 1 is a partially detailed drawing of a seat belt retractor according to a first embodiment of the present invention. FIGS. 2(A) and 2(B) illustrate an entire configuration of the seat belt retractor illustrated in FIG. 1, where FIG. 2(A) is a partially exploded view of the seat belt retractor and FIG. 2(B) is a perspective view of the inside of the retainer. Each of the drawings omits the illustration of the webbing for convenience purposes. In FIG. 1, only the main components in the embodiment are illustrated.

Figure 2A:
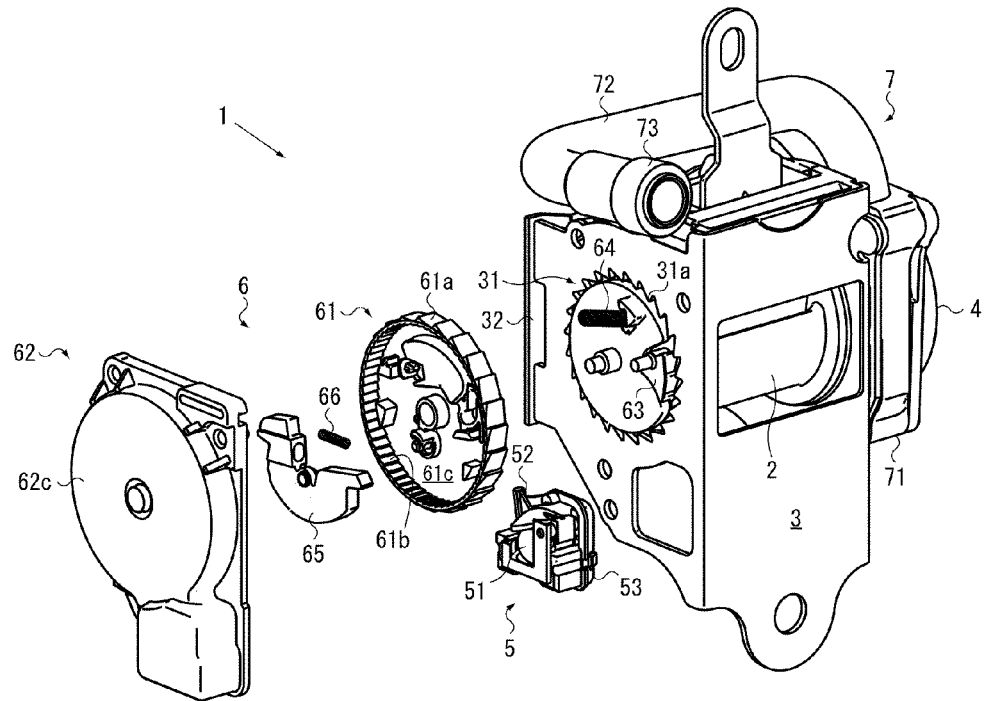
FIGS. 2(A) and 2(B) illustrate an entire configuration of the seat belt retractor illustrated in FIG. 1, where
Figure 2B:
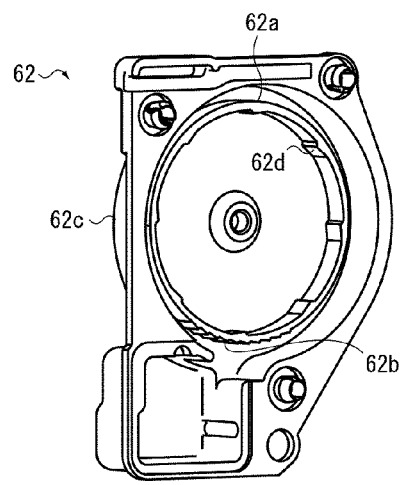

As illustrated in FIG. 1 to FIG. 2(B), a seat belt retractor 1 according to a first embodiment of the present invention includes a spool 2 that retracts a webbing that restrains an occupant, a base frame 3 that accommodates the spool 2 while allowing the spool 2 to rotate, a spring unit 4 that applies a retracting force to the spool 2, a vehicle sensor 5 that detects sudden deceleration of the vehicle, a locking mechanism 6 that is activated by the vehicle sensor 5 and that causes the spool 2 to be engaged with the base frame 3, and a pretensioner 7 that removes the slack of the webbing. The locking mechanism 6 includes a lock gear 61 and a retainer 62. The lock gear 61 includes an outer circumferential wall 61a that is disposed at an end portion of the spool 2 and engageable with the vehicle sensor 5. The retainer 62 includes an inner circumferential wall 62a disposed on the inner side of the outer circumferential wall 61a and a side wall 62e that defines a space accommodating the lock gear 61. The lock gear 61 becomes engaged with the inner circumferential wall 62a of the retainer 62 when the lock gear 61 becomes eccentric relative to the retainer 62.

The spool 2 is a winding drum that retracts the webbing. For example, the spool 2 has its one end rotatably supported by the spring unit 4 and the other end rotatably supported by the retainer 62. The spring unit 4 and the retainer 62 are directly or indirectly fixed to the base frame 3. The spool 2 is inserted into openings 31 formed in the base frame 3 and supported by the spring unit 4 and the retainer 62.

In the seat belt retractor 1 illustrated in FIG. 2(A), the locking mechanism 6, the spool 2, the pretensioner 7, and the spring unit 4 are arranged in this order but the arrangement order is not limited to this order. For example, in the seat belt retractor 1, the spring unit 4, the locking mechanism 6, the spool 2, and the pretensioner 7 may be arranged in this order. In this case, the spool 2 is rotatably supported by the spring unit 4 and a pretensioner cover 71.

The base frame 3 is a frame structure having, for example, a substantially angular U-shaped cross section. A pair of wall members constituting side surfaces is formed on both ends of a wall member constituting a back surface. The openings 31 through which the spool 2 is inserted are formed in the pair of wall members constituting the side surfaces. Alternatively, a tie plate 32 constituting a front surface may be connected to the ends of the pair of wall members constituting the side surfaces. As illustrated in FIG. 2(A), engagement teeth 31a are formed at the inner edge of each opening 31.

The pretensioner 7 is fixed to one of the side surfaces of the base frame 3 and the spring unit 4 is fixed to the outer side of the pretensioner 7. The locking mechanism 6 is disposed on the other side surface of the base frame 3 and the retainer 62 that accommodates the components of the locking mechanism 6 is fixed to the other side surface of the base frame 3. The pretensioner 7 includes, for example, a pretensioner cover 71 that surrounds the outer periphery of a ring gear (not illustrated) connected to the spool 2, a mass body (not illustrated) that applies a rotational force to the ring gear that is injected into the inside of the pretensioner cover 71, a pipe 72 that accommodates the mass body, and a gas generator 73 that provides power to the mass body.

The vehicle sensor 5 includes, for example, a spherical mass body 51, a sensor lever 52 that swings in accordance with a movement of the mass body 51, and a sensor cover 53 that allows the mass body 51 and the sensor lever 52 to be accommodated in the space defined between the sensor cover 53 and the retainer 62. When the vehicle body decelerates to or below a predetermined rate or leans a predetermined degree or greater, the balance of the mass body 51 is lost and the vehicle sensor 5 allows the sensor lever 52 to be pushed upward. Thus, the end of the sensor lever 52 becomes engaged with the lock gear 61, so that the rotation of the lock gear 61 is restricted.

The locking mechanism 6 includes, for example, a pawl 63 swingably disposed at the end portion of the spool 2 (specifically, a locking base connected to the end portion of the spool 2), a spring 64 disposed between the end portion of the spool 2 (locking base) and the lock gear 61 and urging the lock gear 61 in the circumferential direction, the lock gear 61 disposed so as to be rotatable relative to the end portion of the spool 2 (locking base), a flywheel 65 swingably disposed on the lock gear 61, a spring 66 urging the end of the flywheel 65 inward, and the retainer 62 accommodating these components including the lock gear 61.

The lock gear 61 includes a disk portion 61c disposed so as to face the end portion of the spool 2 (locking base) and an outer circumferential wall 61a disposed so as to extend straight toward the outer side along the outer edge of the disk portion 61c. On the outer surface of the outer circumferential wall 61a, engagement teeth 61d engageable with the sensor lever 52 of the vehicle sensor 5 are formed.

The retainer 62 includes a substantially cylindrical protruding portion 62c, which covers the outer circumference of the outer circumferential wall 61a of the lock gear 61, and an inner circumferential wall 62a, formed on the inner side of the protruding portion 62c and disposed on the inner side of the outer circumferential wall 61a of the lock gear 61. Thus, when the locking mechanism 6 is assembled, the outer circumferential wall 61a of the lock gear 61 is inserted into a space between the inner circumferential wall 62a and the protruding portion 62c and the flywheel 65 is disposed on the inner side of the inner circumferential wall 62a. On the inner surface of the inner circumferential wall 62a, hooks 62d engageable with the end of the flywheel 65 are formed. The protruding portion 62c has a side wall 62e disposed along at least part of the outer circumference of the outer circumferential wall 61a of the lock gear 61.

The locking mechanism 6 having such a configuration allows the lock gear 61 to rotate together with the rotation of the spool 2 in a normal state (when the pull-out force on the webbing is smaller than or equal to a predetermined threshold). Because the spool 2 and the lock gear 61 do not rotate relative to each other in the normal state, the pawl 63 thus remains in the state in which the position of the pawl 63 does not interfere with the engagement teeth 31a formed around the opening 31 of the base frame 3.

In the case where the webbing is pulled out at a rate higher than the normal pull-out rate, that is, when the pull-out force on the webbing exceeds a predetermined threshold, the flywheel 65 swings and becomes engaged with one of the hooks 62d of the retainer 62, so that the rotation of the lock gear 61 is restricted. Also in the case where the vehicle sensor 5 is activated, the rotation of the lock gear 61 is restricted as a result of the end of the sensor lever 52 becoming engaged with one of the engagement teeth 61d formed on the outer surface of the outer circumferential wall 61a of the lock gear 61.

When the rotation of the lock gear 61 is restricted in this manner, a relative rotation occurs between the spool 2 and the lock gear 61, the pawl 63 swings in accordance with this relative rotation, and the end of the pawl 63 approaches and becomes engaged with one of the engagement teeth 31a formed around the opening 31 of the base frame 3. Consequently, the rotation of the spool 2 is restricted and pull-out of the webbing is restricted.

As described above, the spool 2 is inserted into the openings 31 of the base frame 3 and a gap is left between the spool 2 and each opening 31 of the base frame 3. In contrast to the base frame 3 having a rigid structure, the spool 2 has a relatively soft structure. Thus, when the webbing is pulled hard in the pull-out direction, the spool 2 may move and become eccentric relative to the base frame 3. Also in the case where the pretensioner 7 is activated, a reaction force may occur in the spool 2, so that the spool 2 may move and become eccentric relative to the base frame 3.

On the other hand, as described above, to restrict the rotation of the lock gear 61 for restricting the rotation of the spool 2, activation of the flywheel 65 or the vehicle sensor 5 is required. This activation involves a predetermined time length, although a short period, until the rotation of the lock gear 61 (spool 2) is restricted.

Thus, the present invention focuses an attention on the phenomenon in which the above-described spool 2 moves and becomes eccentric relative to the base frame 3 and aims to restrict the rotation of the spool 2. Specifically, as illustrated in FIGS. 1 to 2(B), engagement inner teeth 61b are formed on the inner surface of the outer circumferential wall 61a of the lock gear 61 and engagement outer teeth 62b engageable with the engagement inner teeth 61b are formed on at least part of the outer surface of the inner circumferential wall 62a of the retainer 62.

The engagement outer teeth 62b are formed on the retainer 62 (inner circumferential wall 62a), which is a stationary component, whereas the engagement inner teeth 61b are formed on the lock gear 61, which is a rotational component. Thus, preferably, the engagement inner teeth 61b are formed over the entire inner surface of the outer circumferential wall 61a. The engagement outer teeth 62b are formed at a necessary portion, for example, a portion of the inner circumferential wall 62a that touches the outer circumferential wall 61a when the lock gear 61 becomes eccentric in the webbing pull-out direction F (in the arrow direction in FIG. 1).

Figure 3A:
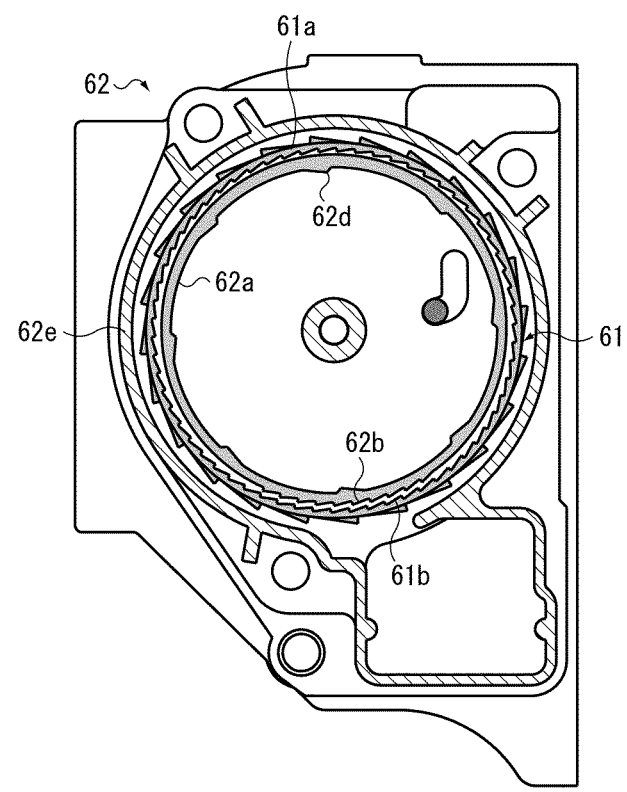
FIGS. 3(A) and 3(B) illustrate an operation of the seat belt retractor illustrated in FIG. 1, where
Figure 3B:
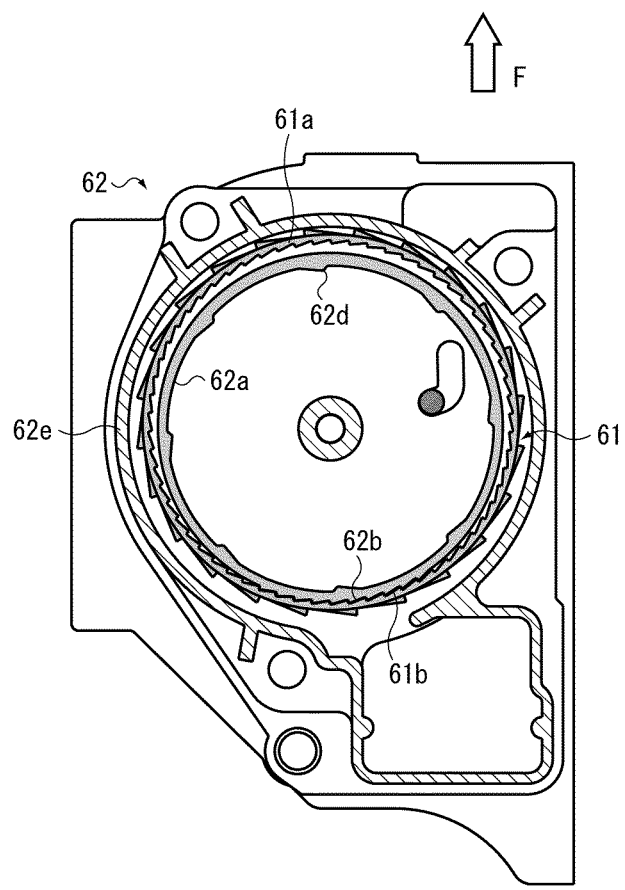

Here, FIGS. 3(A) and (B) illustrate an operation of the seat belt retractor illustrated in FIG. 1, where FIG. 3(A) illustrates a state before the lock gear and the retainer are engaged together and FIG. 3(B) illustrates a state after the lock gear and the retainer are engaged together. FIGS. 3(A) and 3(B) are vertical cross sections of the side wall 62e constituting the protruding portion 62c illustrated in FIG. 2(A) when viewed from the outside of the retainer 62. Throughout the drawings, the outer circumferential wall 61a and the inner circumferential wall 62a are filled with gray for convenience of illustration.

As illustrated in FIG. 3(A), in the normal state, specifically, for example, when the webbing is free from hard pulling force in the webbing pull-out direction F, the spool 2 is not moved (not eccentrically located) relative to the base frame 3, a predetermined gap is left (in a non-engagement state) between the engagement inner teeth 61b of the lock gear 61 and the engagement outer teeth 62b of the retainer 62.

On the other hand, as illustrated in FIG. 3(B), when, for example, the spool 2 is pulled hard in the webbing pull-out direction F, the spool 2 moves and becomes eccentric upward in FIG. 3(B) relative to the base frame 3. Thus, the lock gear 61 also moves upward in FIG. 3(B) and becomes eccentric in association with the movement of the spool 2, whereby the engagement inner teeth 61b of the lock gear 61 and the engagement outer teeth 62b of the retainer 62 touch one another (become engaged together).

This engagement of the engagement inner teeth 61b with the engagement outer teeth 62b enables restriction of the rotation of the lock gear 61 without activating the flywheel 65 or the vehicle sensor 5. Thus, the time taken to restrict the rotation of the spool 2 can be shortened and the performance of the seat belt retractor 1 can be enhanced. In the case where the engagement inner teeth 61b touch a portion of the inner circumferential wall 62a free from the engagement outer teeth 62b, the rotation of the lock gear 61 is not restricted since it has no teeth that become engaged with the engagement inner teeth 61b.

Figure 4A:
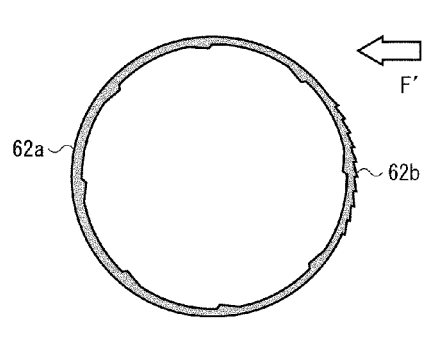
FIGS. 4(A) to 4(C) illustrate modified examples of the seat belt retractor illustrated in FIG. 1, where
Figure 4B:
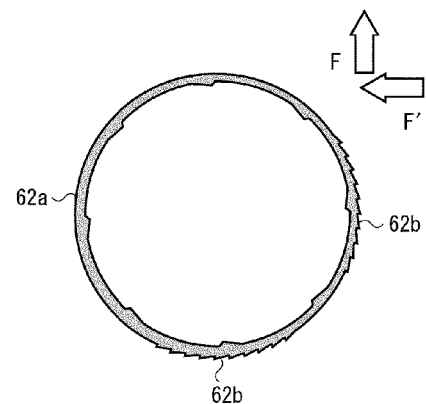
Figure 4C:
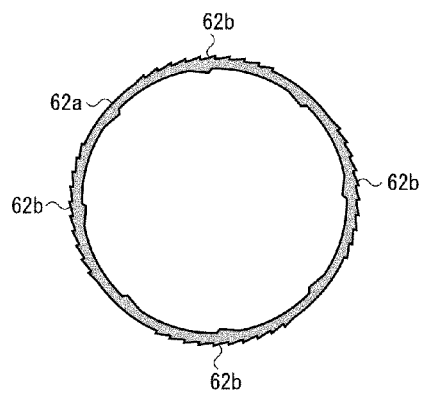

Referring now to FIGS. 4(A) to 4(C), modified examples of the seat belt retractor 1 according to the first embodiment are described. Here, FIGS. 4(A) to 4(C) illustrate modified examples of the seat belt retractor illustrated in FIG. 1, where FIG. 4(A) illustrates a first modified example, FIG. 4(B) illustrates a second modified example, and FIG. 4(C) illustrates a third modified example. Each drawing illustrates only the inner circumferential wall 62a viewed in the same direction as in the case of FIG. 3(A) and omits illustrations of other components as they are the same as those in the above-described embodiment.

The first modified example illustrated in FIG. 4(A) includes engagement outer teeth 62b formed at a portion of the inner circumferential wall 62a that touches the outer circumferential wall 61a when the lock gear 61 becomes eccentric in a direction F' in which the reaction force caused in the spool 2 at activation of the pretensioner 7 is exerted. The second modified example illustrated in FIG. 4(B) includes engagement outer teeth 62b formed at two portions of the inner circumferential wall 62a that touch the outer circumferential wall 61a when the lock gear 61 becomes eccentric in the webbing pull-out direction F and in the direction F' in which the reaction force caused in the spool 2 at activation of the pretensioner 7 is exerted. The third modified example illustrated in FIG. 4(C) includes engagement outer teeth 62b formed at four portions, at the top, bottom, right, and left portions.

In this manner, the engagement outer teeth 62b can be formed as needed on any direction to which the spool 2 possibly moves and becomes eccentric relative to the base frame 3. For example, although not illustrated, the engagement outer teeth 62b may be formed over the entire outer surface of the inner circumferential wall 62a.

Figure 5A:
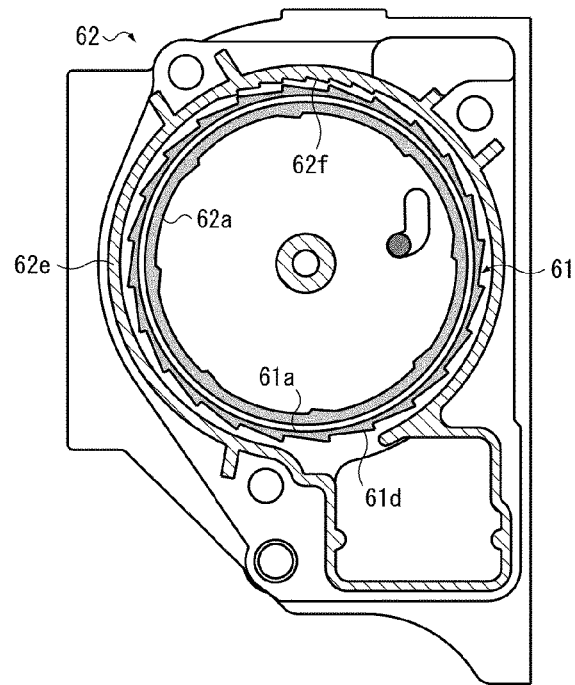
FIGS. 5(A) and 5(B) illustrate a seat belt retractor according to a second embodiment of the present invention, where
Figure 5A:
Figure 5B:
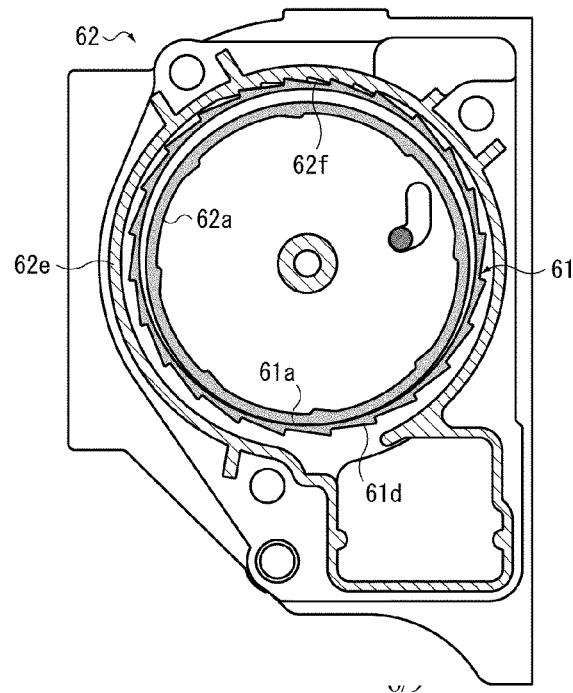

Referring now to FIGS. 5(A) and 5(B), a seat belt retractor according to a second embodiment of the present invention is described below. Here, FIGS. 5(A) and 5(B) illustrate a seat belt retractor according to a second embodiment of the present invention, where FIG. 5(A) illustrates a state before the lock gear and the retainer are engaged together and FIG. 5(B) illustrates a state after the lock gear and the retainer are engaged together. FIGS. 5(A) and 5(B) are vertical cross sections of the side wall 62e constituting the protruding portion 62c illustrated in FIG. 2(A) when viewed from the outside of the retainer 62. Throughout the drawings, components that are the same as those of the above-described first embodiment are denoted by the same symbols and not described repeatedly.

A seat belt retractor 1 according to the second embodiment of the present invention includes engagement teeth 61d, which are engageable with the vehicle sensor 5, on the outer surface of the outer circumferential wall 61a of the lock gear 61 and an engagement portion 62f, which are engageable with the engagement teeth 61d, on at least part of the inner surface of the side wall 62e of the retainer 62. In FIGS. 5(A) and 5(B), the outer circumferential wall 61a and the inner circumferential wall 62a are filled with gray for convenience of illustration.

As illustrated, the engagement portion 62f has a shape of teeth engageable with the engagement teeth 61d. The circumferential pitch of the teeth constituting the engagement portion 62f may be the same as or shorter than the pitch of the engagement teeth 61d. Making the circumferential pitch of the teeth constituting the engagement portion 62f shorter than the circumferential pitch of the engagement teeth 61d allows the eccentric lock gear 61 to become quickly engaged with the retainer 62. The engagement portion 62f is formed at, for example, a portion of the side wall 62e that touches the outer circumferential wall 61a when the lock gear 61 becomes eccentric in the webbing pull-out direction F.

As illustrated in FIG. 5(A), in the normal state, specifically, for example, when the webbing is free from a hard pulling force in the webbing pull-out direction F, the spool 2 is not moved relative to the base frame 3 (not eccentrically located), a predetermined gap is left (in a non-engagement state) between the engagement inner teeth 61b of the lock gear 61 and the engagement outer teeth 62b of the retainer 62.

On the other hand, as illustrated in FIG. 5(B), for example, when the spool 2 is pulled hard in the webbing pull-out direction F, the spool 2 moves upward in FIG. 5(B) and becomes eccentric relative to the base frame 3. Thus, the lock gear 61 also moves upward in FIG. 5(B) and becomes eccentric in association with the movement of the spool 2, whereby the engagement teeth 61d of the lock gear 61 and the engagement portion 62f of the retainer 62 touch one another (become engaged together).

Figure 6A:
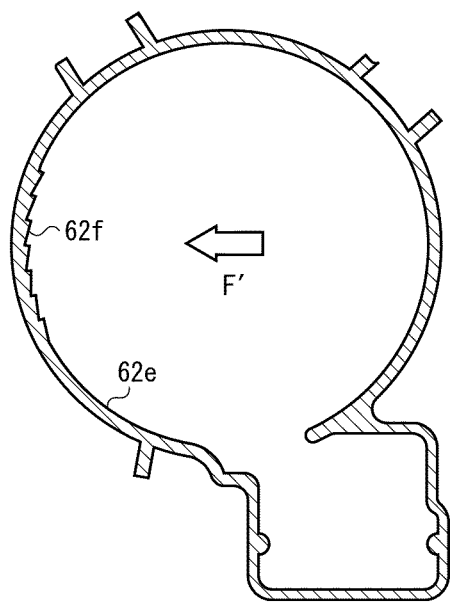
FIGS. 6(A) to 6(C) illustrate modified examples of the seat belt retractor illustrated in FIGS. 5(A) and 5(B), where
Figure 6B:
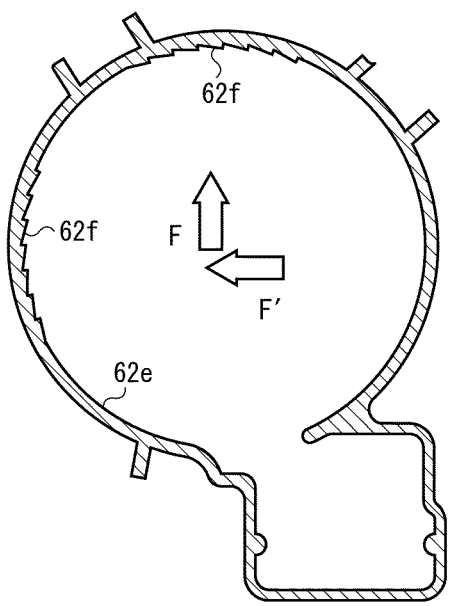
Figure 6C:
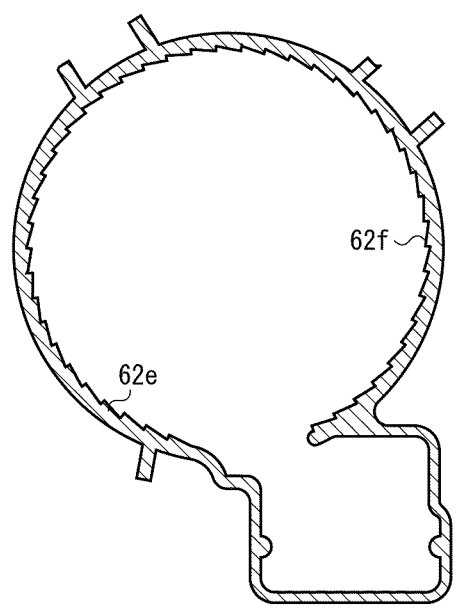

Referring now to FIGS. 6(A) to 6(C), modified examples of the seat belt retractor 1 according to the above-described second embodiment are described below. Here, FIGS. 6(A) to 6(C) illustrate modified examples of the seat belt retractor illustrated in FIGS. 5(A) and 5(B), where FIG. 6(A) illustrates a first modified example, FIG. 6(B) illustrates a second modified example, and FIG. 6(C) illustrates a third modified example. Each drawing illustrates only the side wall 62e viewed in the same direction as in the case of FIG. 5(A) and omits illustrations of other components as they are the same as those in the above-described embodiment.

The first modified example illustrated in FIG. 6(A) includes the engagement portion 62f formed at a portion of the side wall 62e that touches the outer circumferential wall 61a when the lock gear 61 becomes eccentric in a direction F' in which the reaction force caused in the spool 2 at activation of the pretensioner 7 is exerted. The second modified example illustrated in FIG. 6(B) includes the engagement portions 62f formed at two portions of the side wall 62e that touch the outer circumferential wall 61a when the lock gear 61 becomes eccentric in the webbing pull-out direction F or in the direction F' in which the reaction force caused in the spool 2 at activation of the pretensioner 7 is exerted. The third modified example illustrated in FIG. 6(C)

includes the engagement portion 62f formed over substantially the entire area of the side wall 62e covering the outer circumferential wall 61a.

In this manner, the engagement portion 62f can be formed as needed on any direction to which the spool 2 possibly moves and becomes eccentric relative to the base frame 3. The above described second embodiment (including the modified examples) illustrates the case where the side wall 62e defines a space accommodating both of the lock gear 61 and the vehicle sensor 5. However, a space accommodating the lock gear 61 and a space accommodating the vehicle sensor 5 may be separately formed. In this case, the side wall 62e that defines a space accommodating the lock gear 61 is disposed so as to cover the entire circumference of the outer circumferential wall 61a of the lock gear 61, and thus the engagement portion 62f may be formed over the entire circumference of the inner surface of the side wall 62e.

Figure 7:
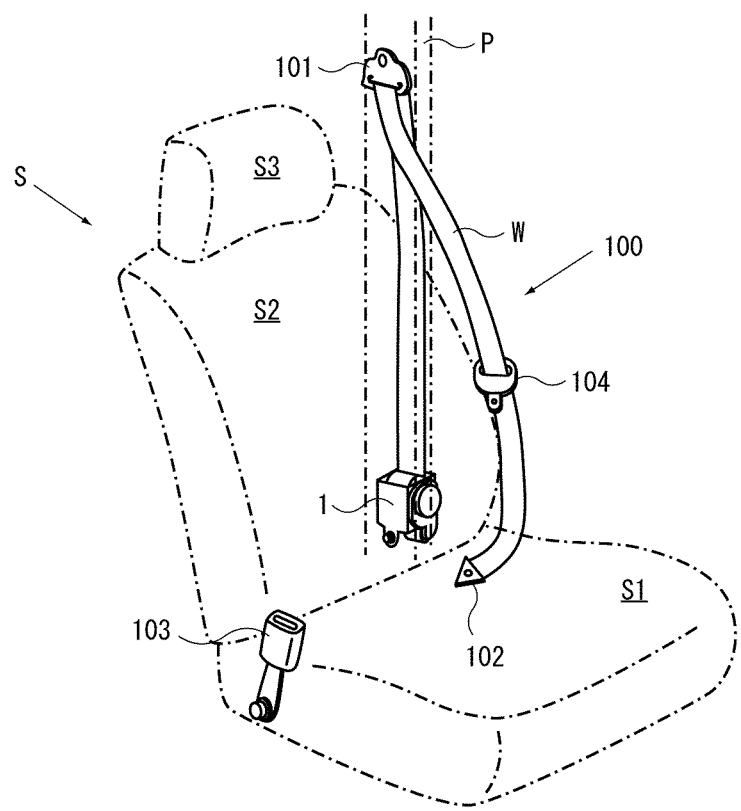
FIG. 7 is a diagram of the entire configuration of a seat belt device according to an embodiment of the present invention.

Referring now to FIG. 7, a seat belt device according to an embodiment of the present invention is described below. Here, FIG. 7 is a diagram of the entire configuration of a seat belt device according to an embodiment of the present invention. In FIG. 7, components other than the seat belt device are drawn with dot-and-dash lines for convenience of illustration.

A seat belt device 100 according to an embodiment illustrated in FIG. 7 includes a webbing W that restrains an occupant, a seat belt retractor 1 that retracts the webbing W, a guide anchor 101 that is disposed on the vehicle body and that guides the webbing W, a belt anchor 102 that fixes the webbing W to the vehicle body, a buckle 103 that is disposed on the side surface of a seat S on which the occupant is seated, and a tongue 104 that is disposed on the webbing W. The seat belt retractor 1 has such a configuration as illustrated in FIG. 1 to FIG. 6(C).

Components other than the seat belt retractor 1 are briefly described below. The seat S includes, for example, a seat portion S1 on which the occupant is seated, a backrest portion S2 located on the back of the occupant, and a headrest portion S2 that supports the head of the occupant. The seat belt retractor 1 is installed in, for example, the B pillar P of a vehicle body.

Generally, the buckle 103 is often disposed on the side surface of the seat portion S1 and the belt anchor 102 is often disposed on the undersurface of the seat portion S1. The guide anchor 101 is often disposed on the B pillar P. The webbing W has one end connected to the belt anchor 102 and the other end connected to the seat belt retractor 1 with the guide anchor 101 interposed therebetween.

When the tongue 104 is to be fitted into the buckle 103, the webbing W is pulled out from the seat belt retractor 1 while slidably moving through an insertion hole of the guide anchor 101. When an occupant wears the seat belt or unfastens the seat belt when getting off the vehicle, the webbing W is retracted until it receives a predetermined load by the operation of the spring unit 4 of the seat belt retractor 1.

The seat belt device 100 above-described has a configuration formed by installing the seat belt retractor 1 according to the above-described embodiment in a normal seat belt device on the front seat. However, the seat belt retractor 1 may be installed in a seat belt device on the rear seat while the guide anchor 101 is omitted.

The present invention is not limited to the above-described embodiments and may be modified in various manners within the scope not departing from the gist of the present invention, for example, the present invention may be applied to a seat belt device used in transportations other than vehicles.

What is claimed is:

1. A seat belt retractor comprising:
a spool that retracts a webbing that restrains an occupant;
a base frame that accommodates the spool while allowing the spool to rotate;
a vehicle sensor that detects sudden deceleration of a vehicle; and
a locking mechanism that is activated by the vehicle sensor and that causes the spool to be engaged with the base frame,
wherein the locking mechanism includes a lock gear and a retainer, the lock gear includes an outer circumferential wall that is disposed at an end portion of the spool and engageable with the vehicle sensor, and the retainer includes an inner circumferential wall disposed on an inner side of the outer circumferential wall and a side wall that defines a space accommodating the lock gear,
wherein engagement inner teeth are formed on an inner surface of the outer circumferential wall and engagement outer teeth engageable with the engagement inner teeth are formed on at least a portion of an outer surface of the inner circumferential wall, and
wherein, when the lock gear becomes eccentric relative to the retainer, the lock gear becomes engaged with the inner circumferential wall of the retainer.

2. The seat belt retractor according to claim 1, wherein the engagement inner teeth are formed over an entire circumference of the inner surface of the outer circumferential wall.

3. The seat belt retractor according to claim 1, wherein the engagement outer teeth are formed at a portion of the inner circumferential wall that touches the outer circumferential wall when the lock gear becomes eccentric in a direction in which the webbing is pulled out.

4. The seat belt retractor according to claim 1, comprising a pretensioner that removes slack of the webbing, wherein the engagement outer teeth are formed at a portion of the inner circumferential wall that touches the outer circumferential wall when the lock gear becomes eccentric in a direction in which a reaction force caused in the spool at activation of the pretensioner is exerted.

5. A seat belt device comprising: a webbing that restrains an occupant; a seat belt retractor that retracts the webbing; a guide anchor that is disposed on a vehicle body and that guides the webbing; a belt anchor that fixes the webbing to the vehicle body; a buckle disposed on a side surface of a seat on which the occupant is seated; and a tongue that is disposed on the webbing,
wherein the seat belt retractor is the seat belt retractor according to claim 1.

6. A seat belt retractor comprising:
a spool that retracts a webbing that restrains an occupant;
a base frame that accommodates the spool while allowing the spool to rotate;
a vehicle sensor that detects sudden deceleration of a vehicle; and a locking mechanism that is activated by the vehicle sensor and that causes the spool to be engaged with the base frame,
wherein the locking mechanism includes a lock gear and a retainer, the lock gear includes an outer circumferential wall that is disposed at an end portion of the spool and engageable with the vehicle sensor, the retainer includes an inner circumferential wall disposed on an inner side of the outer circumferential wall and a side wall that defines a space accommodating the lock gear, wherein engagement teeth engageable with the vehicle sensor are formed on an outer surface of the outer circumferential wall and an engagement portion engageable with the engagement teeth is formed at at least a portion of an inner surface of the side wall, and, wherein, when the lock gear becomes eccentric relative to the retainer, the lock gear becomes engaged with the side wall of the retainer.

7. The seat belt retractor according to claim 6, wherein the engagement portion is formed over a substantially entire area of the side wall that covers the outer circumferential wall.

8. The seat belt retractor according to claim 6, wherein the engagement portion is formed at a portion of the side wall that touches the outer circumferential wall when the lock gear becomes eccentric in a direction in which the webbing is pulled out.

9. The seat belt retractor according to claim 6, comprising a pretensioner that removes slack of the webbing, wherein the engagement portion is formed at a portion of the side wall that touches the outer circumferential wall when the lock gear becomes eccentric in a direction in which a reaction force caused in the spool at activation of the pretensioner is exerted.

10. A seat belt device comprising: a webbing that restrains an occupant; a seat belt retractor that retracts the webbing; a guide anchor that is disposed on a vehicle body and that guides the webbing; a belt anchor that fixes the webbing to the vehicle body; a buckle disposed on a side surface of a seat on which the occupant is seated; and a tongue that is disposed on the webbing, wherein the seat belt retractor is the seat belt retractor according to claim 6.

* * * * *